(12) United States Patent
Tanaka et al.

(10) Patent No.: US 8,497,638 B2
(45) Date of Patent: Jul. 30, 2013

(54) LIGHT SOURCE DEVICE

(75) Inventors: Hiroshi Tanaka, Kyoto (JP); Mitsuhisa Ohnishi, Osaka (JP); Akihisa Yamada, Osaka (JP); Takayoshi Tanaka, Osaka (JP); Manabu Onozaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 240 days.

(21) Appl. No.: 12/868,776

(22) Filed: Aug. 26, 2010

(65) Prior Publication Data

US 2011/0050111 A1 Mar. 3, 2011

(30) Foreign Application Priority Data

Aug. 27, 2009 (JP) ................................. 2009-197277

(51) Int. Cl.
*H05B 37/02* (2006.01)
(52) U.S. Cl.
USPC ............ 315/291; 315/307; 315/312; 315/294
(58) Field of Classification Search
USPC .......... 315/312, 291, 307, 244, 224; 362/561, 362/555, 558, 560, 511, 330, 228; 345/65, 345/62, 149–150
See application file for complete search history.

(56) References Cited

U.S. PATENT DOCUMENTS

| | | | |
|---|---|---|---|
| 2007/0115228 A1 | 5/2007 | Roberts et al. | |
| 2008/0088769 A1* | 4/2008 | Kim et al. | 349/61 |
| 2009/0135331 A1 | 5/2009 | Kawase | |
| 2009/0207125 A1 | 8/2009 | Park et al. | |
| 2010/0027245 A1 | 2/2010 | Cho | |

FOREIGN PATENT DOCUMENTS

| | | |
|---|---|---|
| JP | 62-34468 Y2 | 9/1987 |
| JP | 2-205823 | 8/1990 |
| JP | 2003-187984 | 7/2003 |
| JP | 2003-207780 A | 7/2003 |
| JP | 2005-283852 | 10/2005 |
| JP | 2005-302646 | 10/2005 |
| JP | 2008-53062 A | 3/2008 |
| JP | 2009-516395 | 4/2009 |
| WO | WO 2008/111263 A1 | 9/2008 |

OTHER PUBLICATIONS

European Search Report for corresponding EP Application No. 10172731.1, dated Feb. 24, 2011.

* cited by examiner

*Primary Examiner* — Shawki Ismail
*Assistant Examiner* — Christopher Lo
(74) *Attorney, Agent, or Firm* — Birch, Stewart, Kolasch & Birch, LLP

(57) ABSTRACT

A light source device which is used as the backlight device and does not generate sound is provided. One or more flat substrates each having a light emitting element on its surface side are supported by a chassis having a conductive flat plate surface so that back surfaces of the substrates are opposed to the flat plate surface. The substrate comprises first wiring conductive thin films on a surface side of an insulation substrate, and one or more second radiating or wiring conductive thin films on a back surface side of the insulation substrate. Two terminals of the light emitting element are connected to the two adjacent first conductive thin films. A potential of at least one of the second conductive thin films is fixed to have a constant potential difference or preferably fixed to the same potential with respect to that of the flat plate surface of the chassis.

11 Claims, 13 Drawing Sheets

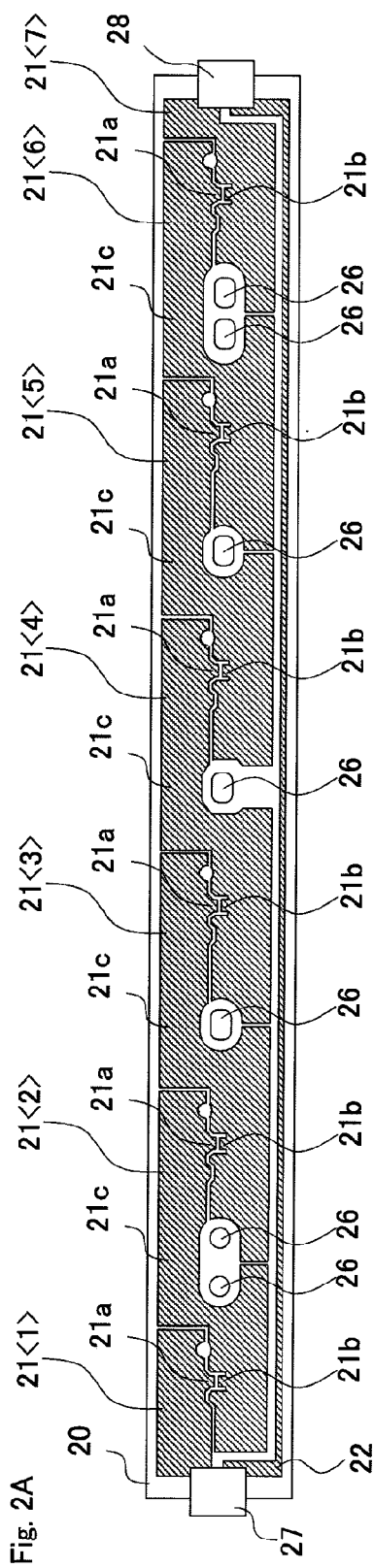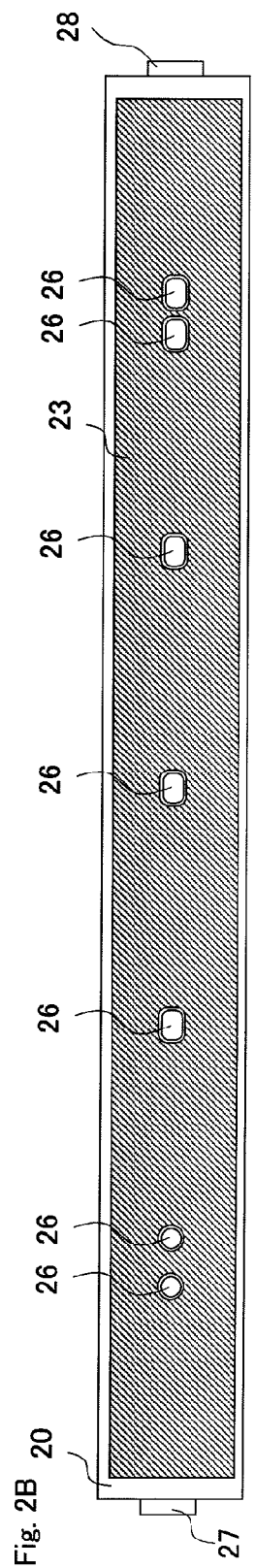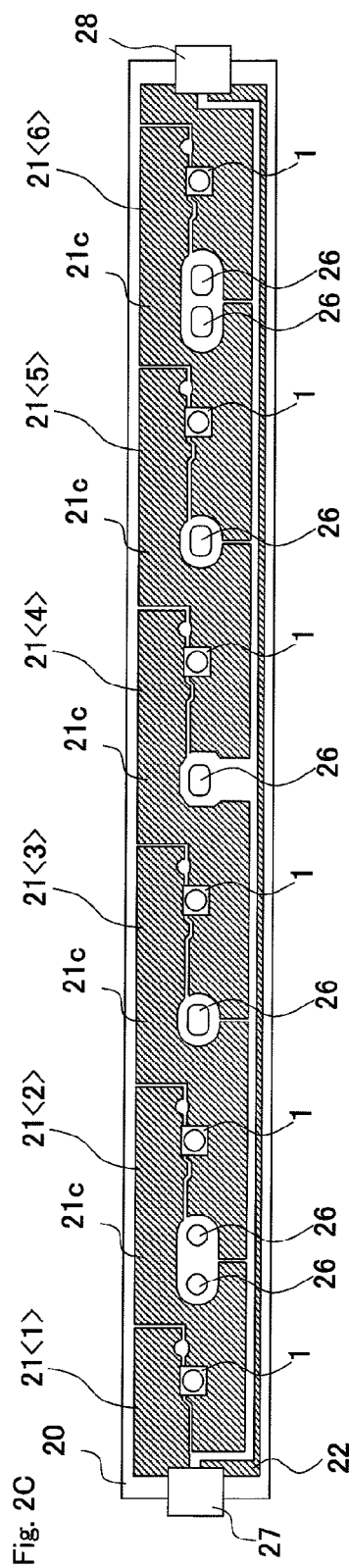

|  |  | Voltage at the time of ON (V) | Voltage at the time of OFF (V) | Voltage Difference between ON and OFF (V) |
| --- | --- | --- | --- | --- |
| Power Supply | Anode Terminal | 152.2 | 152.2 | 0.0 |
| First LED Substrate | LED1 | 141.6 | 144.6 | 3.0 |
|  | LED2 | 131.1 | 137.1 | 6.0 |
|  | LED3 | 120.3 | 129.5 | 9.2 |
|  | LED4 | 109.8 | 122.0 | 12.2 |
|  | LED5 | 99.0 | 114.4 | 15.4 |
| Second LED Substrate | LED6 | 88.3 | 106.8 | 18.5 |
|  | LED7 | 77.9 | 99.3 | 21.4 |
|  | LED8 | 67.1 | 91.7 | 24.6 |
|  | LED9 | 56.3 | 84.1 | 27.8 |
|  | LED10 | 45.5 | 76.6 | 31.1 |
|  | LED11 | 35.1 | 69.0 | 33.9 |
|  | LED12 | 24.3 | 61.4 | 37.1 |
|  | LED13 | 13.9 | 53.9 | 40.0 |

Fig. 8

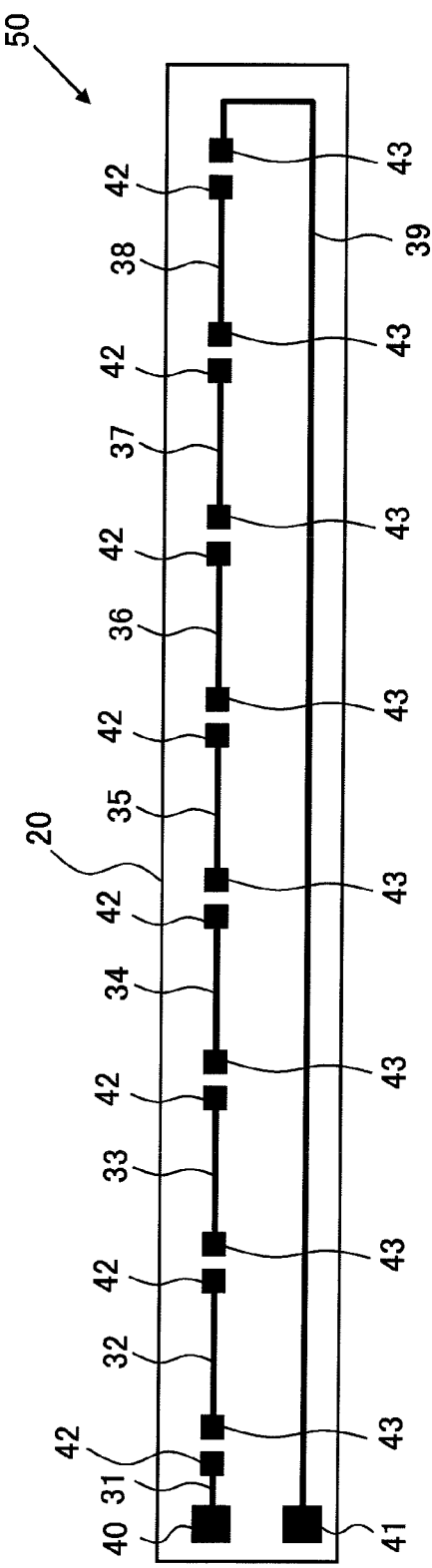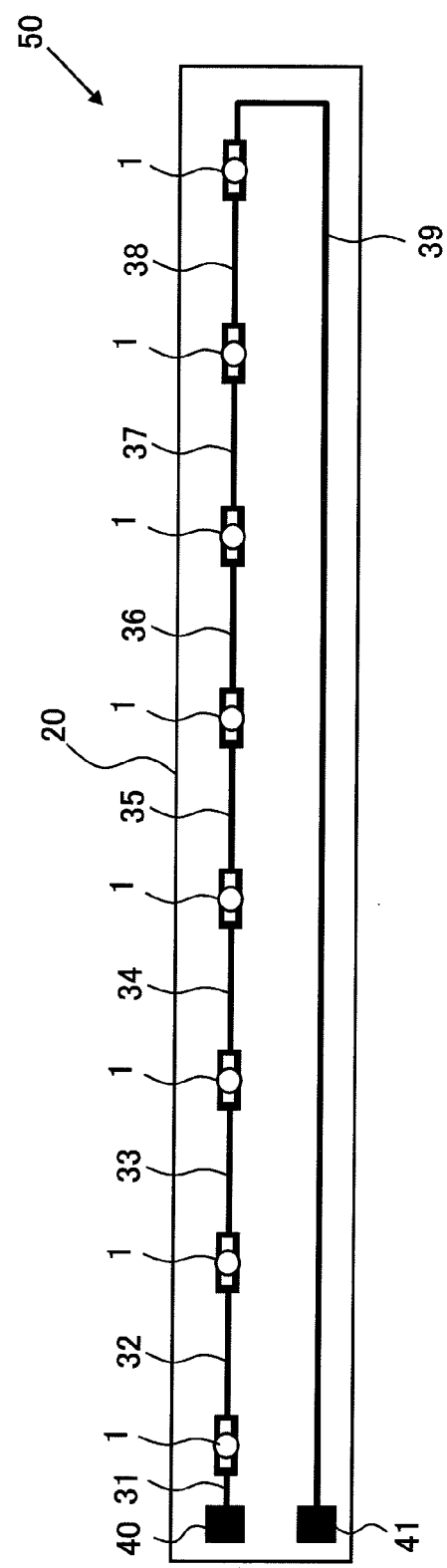

LIGHT SOURCE DEVICE

CROSS REFERENCE TO RELATED APPLICATION

This Nonprovisional application claims priority under 35 U.S.C. §119(a) on Patent Application No. 2009-197277 filed in Japan on 27 Aug. 2009 the entire contents of which are hereby incorporated by reference.

BACKGROUND OF THE INVENTION

1. Field of the Invention

The present invention relates to a light source device in which one or more flat substrates provided with a light emitting element on its surface side are supported by a chassis provided with a conductive flat plate surface in such a matter that a back surface of the substrate is opposed to the flat plate surface, and more particularly to a light source device which can be used as a backlight device of a transmissive liquid crystal display or an illuminating device.

2. Description of the Related Art

A transmissive liquid crystal display is provided with the backlight device as a light source on a back surface of a liquid crystal panel. Conventionally, while a CCFL (Cold Cathode Fluorescent Lamp) has predominated as the light source of the light source device used as the backlight, an LED (Light Emitting Diode) is expected to be used as the light source instead of the CCFL because a technology of the LED has been developed. For example, Japanese Unexamined Patent Application Publication No. 2003-207780 (hereinafter, referred to as Document 1) discloses a backlight device using an LED element as a light emitting element. According to Document 1, a light source device can implement surface irradiation over a whole screen by diffusing the desired number of LED elements uniformly on a substrate. In addition, the surface irradiation can be implemented by arranging a plurality LED modules of a linear light source in which the plurality of LED elements are linearly arranged on a substrate, as disclosed in Japanese Unexamined Patent Application Publication No. 2008-53062. In addition, in the case where the plurality of LED elements are arranged on the substrate, there is a method for arranging the LED elements in parallel like in Document 1, and a method for arranging a predetermined number of LED elements in series as disclosed in Japanese Examined Utility Model Application Publication No. 62-34468.

Therefore, the LED module in which the plurality of LED elements are linearly arranged on a substrate and connected in series is provided with an anode terminal 40 and a cathode terminal 41 in the vicinity of an end side of an insulation substrate 20, to draw out anodes and cathodes at both ends of the plurality of LED elements 1 connected in series as schematically shown in FIGS. 11A and 11B. According to the case shown in FIGS. 11A and 11B, the anode terminal 40 and the cathode terminal 41 are adjacently arranged on one end of a substrate 2. FIGS. 11A and 11B show an LED module 50 in which eight LED elements are connected in series, as one example. Here, FIG. 11A shows a state before the LED elements 1 are mounted, and FIG. 11B shows a state after the LED elements 1 have been mounted.

In the LED module 50, nine connecting wires 31 to 39 to connect the eight LED elements 1 in series are formed on the insulation substrate 20, and the connecting wires 31 to 39 are apart from each other and their ends are adjacently and sequentially arranged. One end of the first connecting wire 31 is connected to the anode terminal 40, and the other end is connected to an electrode 42 connected to an anode of the LED element 1. Each one end of the second to eighth connecting wires 32 to 38 is connected to the electrode 43 connected to the cathode of the LED element 1, and each other end thereof is connected to an electrode 42 connected to an anode of the LED element 1. One end of the ninth connecting wire 39 is connected to the cathode terminal 41 and the other end is connected to the electrode 43 connected to the cathode of the LED element 1. Thus, by connecting the anode and cathode of the LED element to the electrodes 42 and 43 provided at the adjacent ends of the adjacent connecting wires, respectively, the LED module is configured as the module in which the eight LED elements 1 are forwardly connected in series between the anode terminal 40 and the cathode terminal 41.

FIGS. 12 and 13 are configuration views of an LED light source device in which the LED modules 50 shown in FIGS. 11A and 11B are arranged by 2×4 in the form of a matrix and the LEDs are arranged on a plane surface. For example, as shown in FIG. 12, according to a configuration in which the LED modules 50 are arranged in parallel, a control substrate 51 to drive the LED elements of each LED module 50 and to control its emitted light is provided outside, and the anode terminal 40 and the cathode terminal 41 of each LED module 50 are connected to the control substrate 51 through an external wire 52. Furthermore, as shown in FIG. 13, according to a configuration in which four groups each composed of the two LED modules 50 connected in series are arranged in parallel, the one anode terminal 40 is connected to the other cathode terminal 41 between the two adjacent LED modules 50, and the other anode terminal 40 and the other cathode terminal 41 are connected to the control substrate 51 through the external wire 52. In either configuration, the light emission of each LED module 50 can be controlled by the control substrate 51. In addition, regarding the configuration shown in FIG. 13, since the LED modules 50 are connected in series, the number of terminals required for controlling the control substrate 51 can be reduced.

Recently, the televisions are required to be reduced in thickness and weight. The reduction in weight can be implemented by reducing the number of components and reducing the size of the component in general. As a result, the substrate of the LED backlight is also reduced in area and in weight by arranging the strip-shaped substrates in the form of the array as shown in FIG. 12 instead of spreading the LED elements all over the surface in the form of an array, whereby the weight reduction is implemented. Furthermore, the substrate is reduced in weight by reducing a thickness.

In addition, a simple method is employed in fixing the LED substrate with a view to reducing labor cost and because the LED substrate is reduced in size and weight. For example, instead of fixing the LED substrate with screws over the whole surface, a simple method such that both ends of the strip-shaped substrate are fixed with rivets (allowance is provided as compared with the fixing with screws) is used to implement inexpensive production.

Furthermore, as for the reduction in thickness, it is required to reduce a distance from the chassis of the backlight device to a liquid crystal panel surface in the market. As a result, a gap between the chassis of the backlight device and the LED substrate is considerably narrowed.

Because of the above reduction in weight, the LED substrate could be displaced even with small force. As a matter of course, since the LED substrate is fixed to the chassis, it is not largely moved, but the LED substrate could be slightly moved with small force because the substrate itself is bent due to reduction in thickness to reduce its weight, and there is an allowance gap of the small rivet.

The inventor of this application has confirmed that the LED backlight device generates a noise (sound) under the above circumstances. Some level of sound reaches as high as 30 dB although depending on the size of the backlight device (corresponding liquid panel screen size), which negatively affects the viewing and listening of the television serving as audio visual (AV) equipment. Further examination has found that this sound phenomenon is generated due to contact between the LED substrate and the chassis provided on its back surface.

By the way, when the LED elements are connected in series on the LED substrate, the same current flows in the LED elements, so that an essentially great benefit is that brightness of the LED element is uniform. Meanwhile, when the LED elements are connected in parallel, the problem is that the brightness of the LED element is not uniform unless the LED elements are driven separately. In addition, when the LED elements are driven separately, a wire for driving each LED element is needed, and the number of terminals of the drive circuit is increased, which is a problem for the LED substrate having the many LED elements. Therefore, the above problem is solved by connecting the LED elements in series.

However, when the LED elements are connected in series, a drive voltage of the LED elements becomes high, so that a potential fluctuation of the LED substrate due to the on/off of the LED element also becomes large, which has been turned out to cause the sound to become conspicuous.

SUMMARY OF THE INVENTION

The present invention has been made to solve the above problem of the sound phenomenon of the backlight device, and it is an object of the present invention to provide a light source device which can be used as the backlight device and does not generate sound.

In order to achieve the above object, the present invention provides a light source device comprising one or more flat substrates each having a light emitting element on its surface side, the substrates being supported by a chassis having a conductive flat plate surface so that back surfaces of the substrates are opposed to the flat plate surface of the chassis, wherein each of the substrates is provided with a plurality of first conductive thin films for wiring formed on a surface side of an insulation substrate, and one or more second conductive thin films for radiating or wiring formed on a back surface side of the insulation substrate, two terminals of the light emitting element are connected to the two adjacent first conductive thin films, respectively and a potential of at least one of the second conductive thin films is fixed to have a constant potential difference with respect to a potential of the flat plate surface of the chassis.

Furthermore, as for the light source device having the above characteristics, it is more preferable that the potential of at least one of the second conductive thin films is fixed to the same potential as the potential of the flat plate surface of the chassis.

According to the light source device having the above characteristics, since a voltage applied to a capacitor formed of parallel flat plates composed of the second conductive thin films on the back surface side of the substrates and the flat plate surface of the chassis is constant or zero, the coulombic force induced between the parallel flat plates is constant and does not change, so that a change in distance between the parallel flat plates due to fluctuation in coulombic force is suppressed, and the sound due to the oscillation or contact of the parallel flat plates can be suppressed. Especially, when the potential of the second conductive thin films on the back surface side of the substrates is made to conform to that of the flat plate surface of the chassis, the coulombic force becomes zero, so that the sound due to the disposition of the parallel flat plates can be completely eliminated.

Furthermore, as for the light source device having the above characteristics, it is preferable that at last one of the second conductive thin films is a radiating conductive thin film, and not electrically connected to the terminals of the light emitting element.

Thus, when the second conductive thin films on the back surface side of the substrates are electrically isolated from the first conductive thin films on the surface side, the potential of the second conductive thin films can be optionally set, so that it can be easily made to conform to that of the flat plate surface of the chassis, and the sound phenomenon can be easily and surely suppressed.

Furthermore, as for the light source device having the above characteristics, it is preferable that the plurality of light emitting elements are mounted on the one or more substrates, and at least two of the plurality of light emitting elements are connected in series to form a series circuit, and brightness of the plurality of light emitting elements of the series circuit is controlled by supplying a fixed potential from one side end of the series circuit and driving a current flowing in the series circuit from the other side end of the series circuit.

Furthermore, as for the light source device having the above characteristics, it is preferable that a connection terminal is provided at an end side of each of the substrates or in a vicinity of the end side, electrically connected to the first conductive thin film formed in the vicinity of the end side, and used to electrically connect to an external circuit or another substrate, in which a series circuit is formed of the light emitting elements mounted on the plurality of substrates by connecting the connection terminal of one substrate to the connection terminal of another substrate to connect the plurality of substrates, and brightness of the plurality of light emitting elements of the series circuit is controlled by supplying a fixed potential from one side end of the series circuit and driving a current flowing in the series circuit from the other side end of the series circuit.

Thus, when the series circuit of the light emitting elements is formed to control the brightness of the light emitting elements, the brightness of the plurality of light emitting elements can be uniformly controlled with the small number of control circuits. However, the amount of displacement between the parallel flat plates increases when the coulombic force fluctuates because the drive voltage becomes high, and the sound is generated conspicuously. However, since the voltage applied to the parallel flat plates is constant or zero, it is prevented that the sound is generated conspicuously because the plurality of light emitting elements are connected in series. Therefore, the present invention is especially effective in the configuration in which the plurality of light emitting elements are connected in series.

Furthermore, as for the light source device having the above characteristics, it is preferable that a potential of the second conductive thin films is fixed to have a predetermined potential difference with respect to the potential of the flat plate surface of the chassis in at least one of the substrates, provided with the light emitting element having a maximum potential fluctuation at a terminal of the light emitting element due to the drive of the current flowing in the series circuit.

Thus, without needing to make the second conductive thin films on the back surface side of the substrates have a constant potential difference from or be the same as that of the flat plate surface of the chassis with respect to each substrate, the sound can be effectively suppressed when the above is performed in only the specific substrate whose potential fluctuation in the second conductive thin films is great due to the capacitive coupling with the potential fluctuation of the first conductive thin films.

Furthermore, as for the light source device having the above characteristics, it is preferable that the current flowing in the series circuit is driven by pulse width modulation.

When the current flowing in the light emitting element is driven by the pulse width modulation, the potential fluctuation induced in the second conductive thin films increases and the coulombic force fluctuates because the current is driven intermittently, so that the displacement amount of the parallel flat plates increases. As a result, the sound is generated conspicuously. However, since the voltage applied between the parallel flat plates becomes constant or zero, it is prevented that the sound is generated conspicuously because the plurality of light emitting elements are connected in series. Therefore, the present invention is especially effective in the configuration in which the plurality of light emitting elements are connected in series and driven by the pulse width modulation.

Furthermore, as for the light source device having the above characteristics, it is preferable that the potential of the second conductive thin films is fixed to the same potential as the potential of the flat plate surface of the chassis, by a conductive member to mount the substrates on the chassis.

Furthermore, as for the light source device having the above characteristics, it is preferable that the potential of the second conductive thin films is fixed to the same potential as the potential of the flat plate surface of the chassis by opening a part of an insulation film covering the second conductive thin films provided on the back surface side of the substrates, and bringing the second conductive thin films exposed from the opening part of the insulation film into contact with the flat plate surface of the chassis directly or through a conductive connection member.

Furthermore, as for the light source device having the above characteristics, it is preferable that a second connection terminal is provided at an end side of each of the substrates or in a vicinity of the end side, electrically connected to the second conductive thin films formed in the vicinity of the end side, and used to electrically connect to an external circuit or another substrate, in which the potential of the second conductive thin films is fixed to the same potential as the potential of the flat plate surface of the chassis by electrically connecting the second connection terminal to the flat plate surface of the chassis.

According to the three kinds of light source devices described above, the second conductive thin films and the flat plate surface of the chassis can be easily set to be the same potential, and the sound can be simply and easily suppressed.

BRIEF DESCRIPTION OF THE DRAWINGS

FIGS. 2A to 2C are a plan view schematically showing a configuration on a surface side of an LED substrate before LED elements are mounted, a plan view schematically showing a configuration on the surface side of the LED substrate after the LED elements are mounted, and a plan view schematically showing a configuration on a back surface side of the LED substrate;

FIG. 8 is a list of voltage data showing a voltage change generated in a cathode terminal of each LED element of a series circuit composed of 13 LED elements;

FIGS. 11A and 11B are plan views schematically showing one configuration example of a conventional LED module;

DESCRIPTION OF THE PREFERRED EMBODIMENTS

An embodiment of a light source device according to the present invention will be described with reference to the drawings. In addition, in the following drawings, a main part is emphasized and a dimension ratio of each part does not coincide with an actual dimension ratio, in order to easily understand the description.

Figure 1:
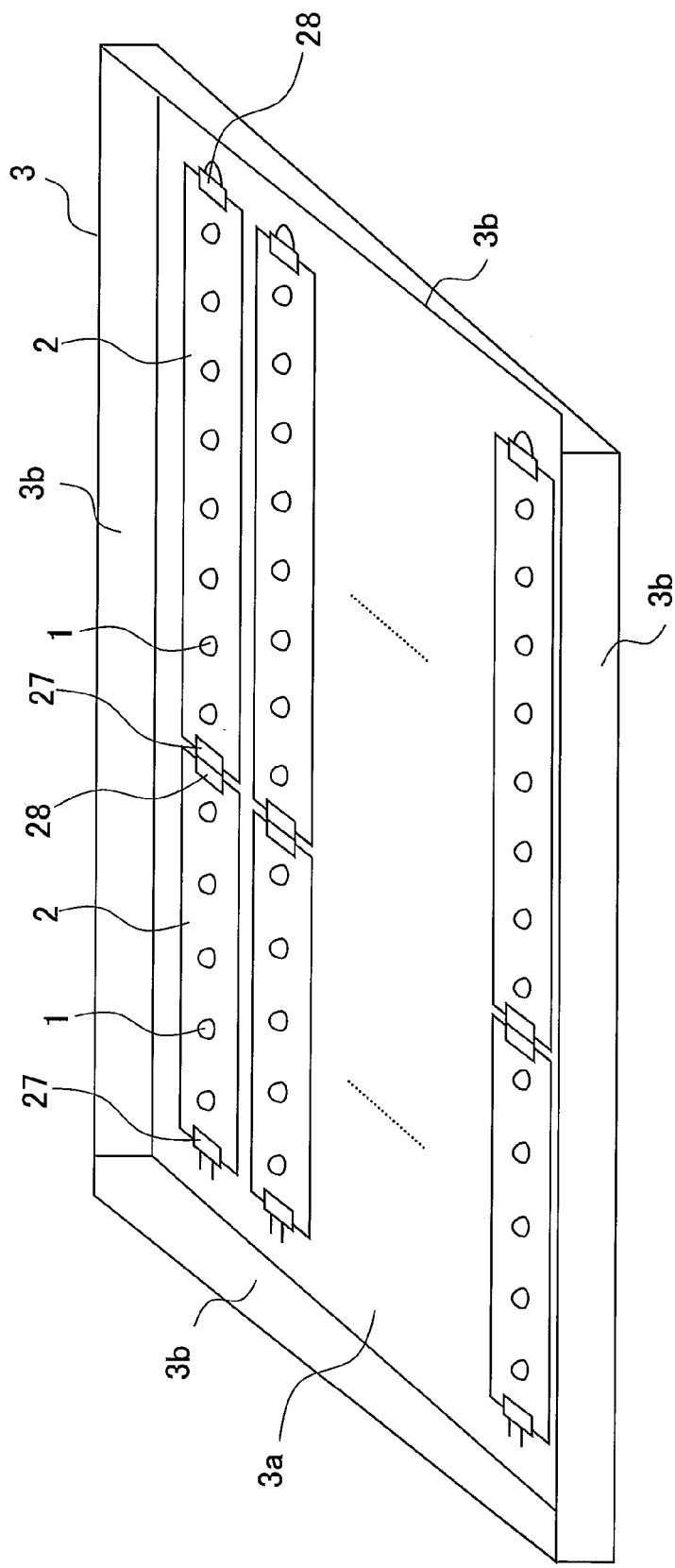
FIG. 1 is a perspective view schematically showing a configuration of a light source device according to one embodiment of the present invention.

As shown in FIG. 1, a light source device according to this embodiment (hereinafter, referred to as the light source device simply) is configured in such a manner that a flat LED substrate 2 having LED elements 1 on its surface is mounted on a chassis 3.

The LED element 1 is formed in such a manner that one or more (such as tow to four) LED chips (semiconductor bare chips) are connected in series and sealed in a translucent package, and composed of a pair of an anode terminal and a cathode terminal.

Figure 3:
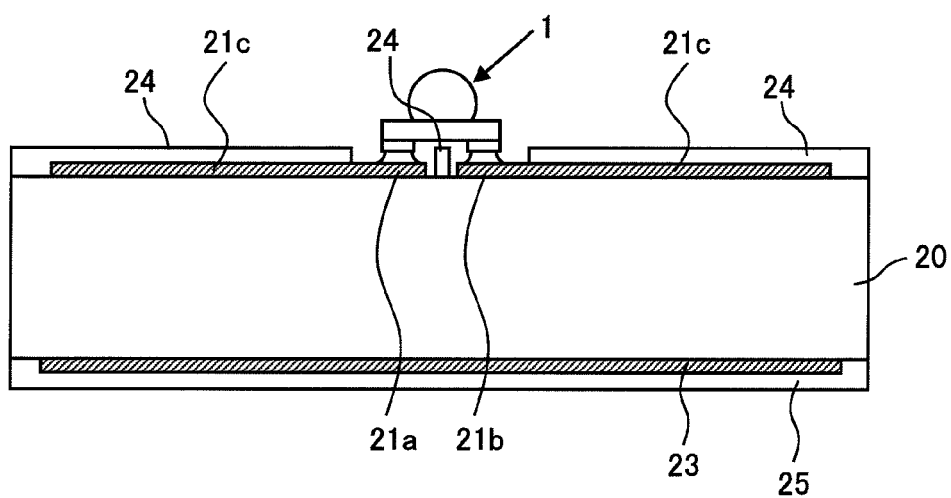
FIG. 3 is a cross-sectional view schematically showing an essential part after the LED elements are mounted on the LED substrate.

As schematically shown in FIGS. 2A to 2C and FIG. 3, the LED substrate 2 includes wiring metal thin films 21 (21 <1> to 21 <7>) and 22 provided on a surface side of a strip-shaped insulation substrate 20, and one radiating metal thin film 23 provided on a back surface side thereof, and solder resists 24 and 25 serving as insulation films to cover the wiring metal thin films 21 and 22 and the radiating metal thin film 23 are provided on both surfaces of the substrate 2. FIG. 2A is a plan view on the surface side of the LED substrate 2, in which the LED element 1 and the solder resist 24 are not shown. FIG. 2B is a plan view on the back surface side of the LED substrate 2, in which the solder resist 25 is not shown. FIG. 2C is a plan view on the surface side of the LED substrate 2 provided with the LED elements 1, in which the solder resist 24 is not shown. FIG. 3 is a cross-sectional view schematically showing an essential part of the LED substrate 2, in which the LED element 1 is connected to the LED substrate 2. Here, the LED element 1 corresponds to a "light emitting element", the LED substrate 2 corresponds to a "substrate", the wiring metal thin films 21 and 22 correspond to a "first conductive thin film", and the radiating metal thin film 23 corresponds to a "second conductive thin film".

The insulation substrate 20 is formed of woven or unwoven glass fiber or organic fiber impregnated with a resin (such as epoxy resin or cyanate resin). The wiring metal thin films 21 and 22 and the radiating metal thin film 23 are metal thin films composed of copper or the like, and may be plated with gold on their top surfaces according to need. The insulation substrate 20 has a plurality of through holes 26 (seven in FIG. 1) through which the LED substrate 2 is secured to the chassis 3 with screws or rivets. Each of the wiring metal thin films 21 and 22, the radiating metal thin film 23, and the solder resists 24 and 25 is formed so as not to overlap with the through hole 26 and its vicinity. In addition, on the surface side of the LED substrate 2, an opening part is formed in the wiring metal thin film 21 and the solder resist 24, and it is used when an optical lens to diffuse emitted light of the LED element 1 in a lateral direction (parallel to the substrate surface) is bonded and fixed to the insulation substrate 20 although it is not shown.

The wiring metal thin films 21 <2> to 21 <6> are provided with land parts 21a and 21b electrically connected to the anode terminal and the cathode terminal of the LED element 1, the wiring metal thin film 21 <1> is provided with the land part 21a electrically connected to the anode terminal of the LED element 1, and the wiring metal thin film 21 <7> is provided with the land part 21b electrically connected to the cathode terminal of the LED element 1. The solder resists 24 on the surface side has opening parts to expose the land parts 21a and 21b, and is formed so as to cover a wiring part 21c other than the land parts 21a and 21b.

The one land part 21a and the other land part 21b of the adjacent wiring metal thin films 21 are closely provided, and the anode terminal is connected to the cathode terminal in the one LED element 1, so that the six LED elements 1 are connected in series between the wiring metal thin film 21 <1> and 21 <7>. Here, the number of the LED elements 1 mounted on the LED substrate 2 is not limited to six. In addition, the number of the wiring metal thin films 21 is determined according to the number of the LED elements 1.

The wiring metal thin film 22 extends in a longitudinal direction of the LED substrate 2, and it is not used for electrically connecting the LED elements 1 mounted on the same substrate but used for connecting one end to the other end of the LED substrates 2. While the solder resist 25 covers the radiating metal thin film 23 on the back surface side, it does not necessarily have to insulate between the radiating metal thin film 23 and the chassis 3 because the radiating metal thin film 23 is set at the same potential as that of the chassis 3 and does not serve as the wiring film as will be described below.

In addition, in order to efficiently diffuse heat generated due to the light emission of the LED element 1, the radiating metal thin film 23 is provided so as to almost completely cover the back surface of the insulation substrate 20, on the back surface side of the LED substrate 2. In addition, the wiring part 21c of the wiring metal thin film 21 is also patterned so as to cover the surface of the insulation substrate 20 to a maximum extent.

Figure 4:
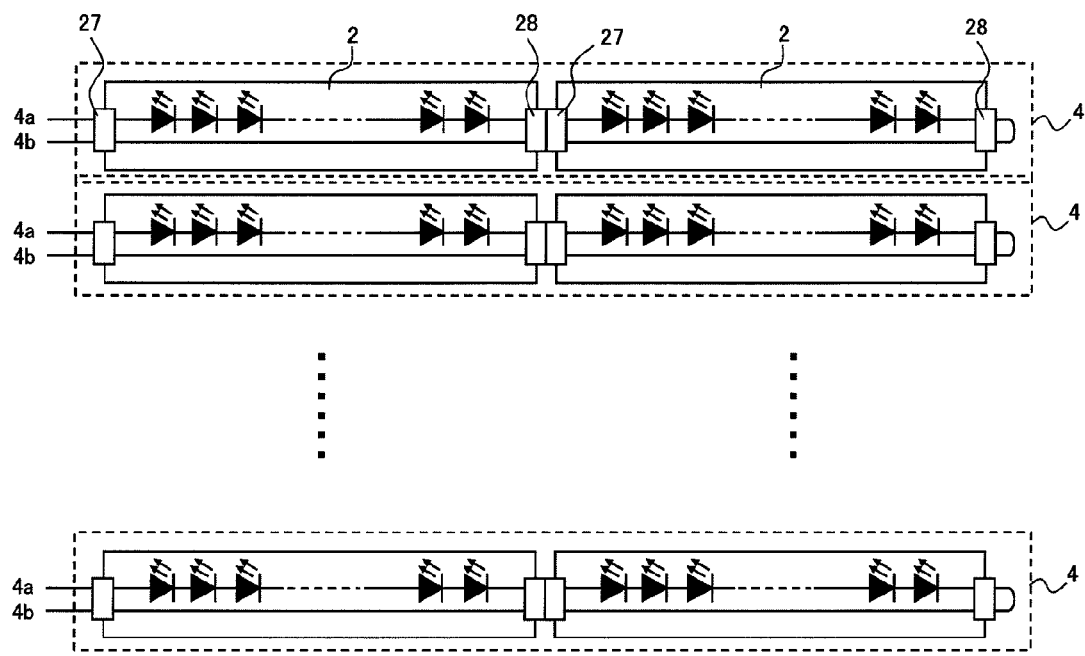
FIG. 4 is a view schematically showing a connection example in which the plurality of LED substrates are arranged in the form of an array.

Two-terminal connectors 27 and 28 are provided at longitudinal both ends of the LED substrate 2, and one is a male connector and the other is a female connector. One terminal of the connector 27 is connected to the wiring metal thin film 21 <1>, and the other thereof is connected to one end of the wiring metal thin film 22, and one terminal of the connector 28 is connected to the wiring metal thin film 21 <7>, and the other thereof is connected to the other end of the wiring metal thin film 22. The plurality of LED substrates 2 arranged in the longitudinal direction of the LED substrate 2 are connected by connecting the one connector 28 sequentially to the other connector 27 between the two adjacent LED substrates 2 and the two terminals of the last connector 28 are short-circuited. Thus, a series circuit is formed of all of the LED elements 1 mounted on the sequentially connected LED substrates 2 between the two terminals of the head connector 27. Therefore, the one terminal of the head connector 27 serves as the anode terminal of the series circuit of the LED elements 1, and the other serves as the cathode terminal thereof. The number of the LED elements 1 in each of the sequentially connected LED substrate 2 is not necessarily the same, and when the LED substrates 2 having different number of LED elements 1 are combined, the series number of the series circuit of the LED elements 1 can be adjusted. As schematically shown in FIG. 4, the plurality of LED substrates 2 are arranged in the longitudinal direction of the LED substrate 2 and in its perpendicular direction in the form of an array, and the LED substrates 2 arranged in the longitudinal direction are connected as described above, whereby the series circuits 4 of the LED elements 1 are arranged in parallel.

The chassis 3 is a metal chassis in the form of a flat box to house the LED substrates 2, and composed of a rectangular back surface plate 3a and four side plates 3b connected to its four sides, and its front surface is open. When a diffuser plate or a translucent plate material is provided on the front surface, the light source device can be used as a backlight device for a liquid crystal display or an illuminating device. Here, the back surface plate 3a of the chassis 3 corresponds to a "flat plate surface". In addition, the chassis 3 is fixed to the ground potential in this embodiment.

Next, a description will be briefly made of a method for fixing the potential of the radiating metal thin film 23 of the LED substrate 2 to the same potential as that of the back surface plate 3a of the chassis 3 in order to prevent a noise (sound) of the light source device which will be described below.

This method includes various methods because it only has to make the potential of the radiating metal thin film 23 conform to the potential of the back surface plate 3a. For example, as a first method, one end of a lead is connected to the radiating metal thin film 23 by soldering, and the other end is connected to the chassis 3. As a second method, one part (such as a part around the through hole 26 provided in the insulation substrate 20 on the back surface side) of the solder resist 25 covering the radiating metal thin film 23 is largely opened, or without forming the solder resist 25 all over, the LED substrate 2 is secured to the back surface plate 3a with a screw or rivet so that the radiating metal thin film 23 is directly in contact with the back surface plate 3a. In addition, in the second method, it is preferable to provide a projection part projecting toward the radiating metal thin film 23, on the back surface plate 3a so that the radiating metal thin film 23 can be easily in contact with the back surface plate 3a. As a third method, a conductive tape such as an aluminum tape is attached on the solder resist 25, and it is partially pressed with a center punch and the like to penetrate the solder resist 25 to be in contact with the radiating metal thin film 23, and then the LED substrate 2 is secured to the back surface plate 3a with the screw or rivet so that the conductive tape is directly in contact with the back surface plate 3a. In addition, in the third method, it is preferable to provide a projection part projecting toward the radiating metal thin film 23, on the back surface plate 3a to be in contact with the conductive tape so that the conductive tape can be easily in contact with the back surface plate 3*a*. The projection part of the back surface plate 3*a* in the second and third methods may be formed by attaching the conductive tape such as the aluminum tape on the back surface plate 3*a*. As a fourth method, three-terminal connectors 27 and 28 are provided at longitudinal both ends of the LED substrate 2, and one terminal of each connector is connected to the radiating metal thin film 23, so that the terminal of the connector 27 connected to the radiating metal thin film 23 has the same potential as that of the back surface plate 3*a*. In addition, the method to make the potential of the radiating metal thin film 23 conform to that of the back surface plate 3*a* is not limited to the above first to fourth methods.

Next, a detailed description will be made of a mechanism of generating the noise (sound) of the light source device, and the reason why the sound is effectively suppressed by setting the potential of the radiating metal thin film 23 to be the same potential as that of the back surface plate 3*a*, with reference to the drawings.

Figure 5A:
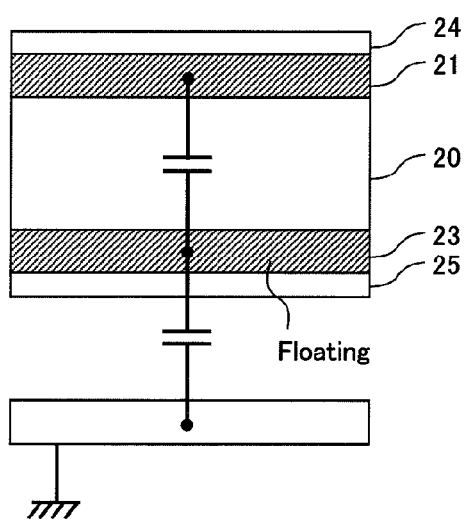
FIGS. 5A and 5B are cross-sectional views schematically showing a positional relationship and a cross-sectional structure of each part of the LED substrate and a chassis.
Figure 5B:
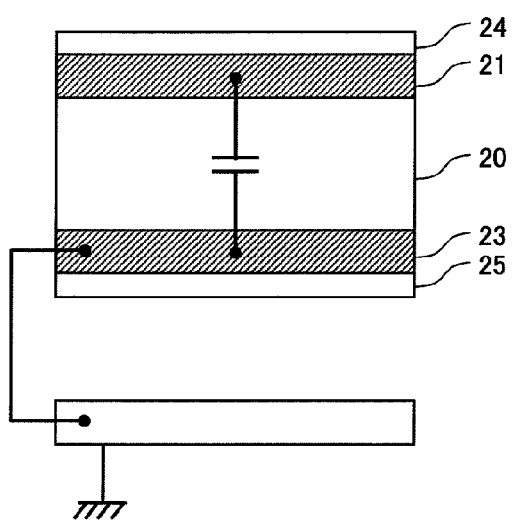

FIGS. 5A and 5B are cross-sectional views schematically showing a positional relationship and a cross-sectional structure of each of the LED substrate 2 and the chassis 3. FIG. 5A shows a case where the radiating metal thin film 23 is in a floating state, and FIG. 5B shows a case where the potential of the radiating metal thin film 23 is at the same potential as that of the back surface plate 3*a*. Since the insulation substrate 20 is interposed between the wiring metal thin film 21 on the surface side and the radiating metal thin film 23 on the back surface side, it functions as a capacitor between the wiring metal thin film 21 and the radiating metal thin film 23.

Figure 6:
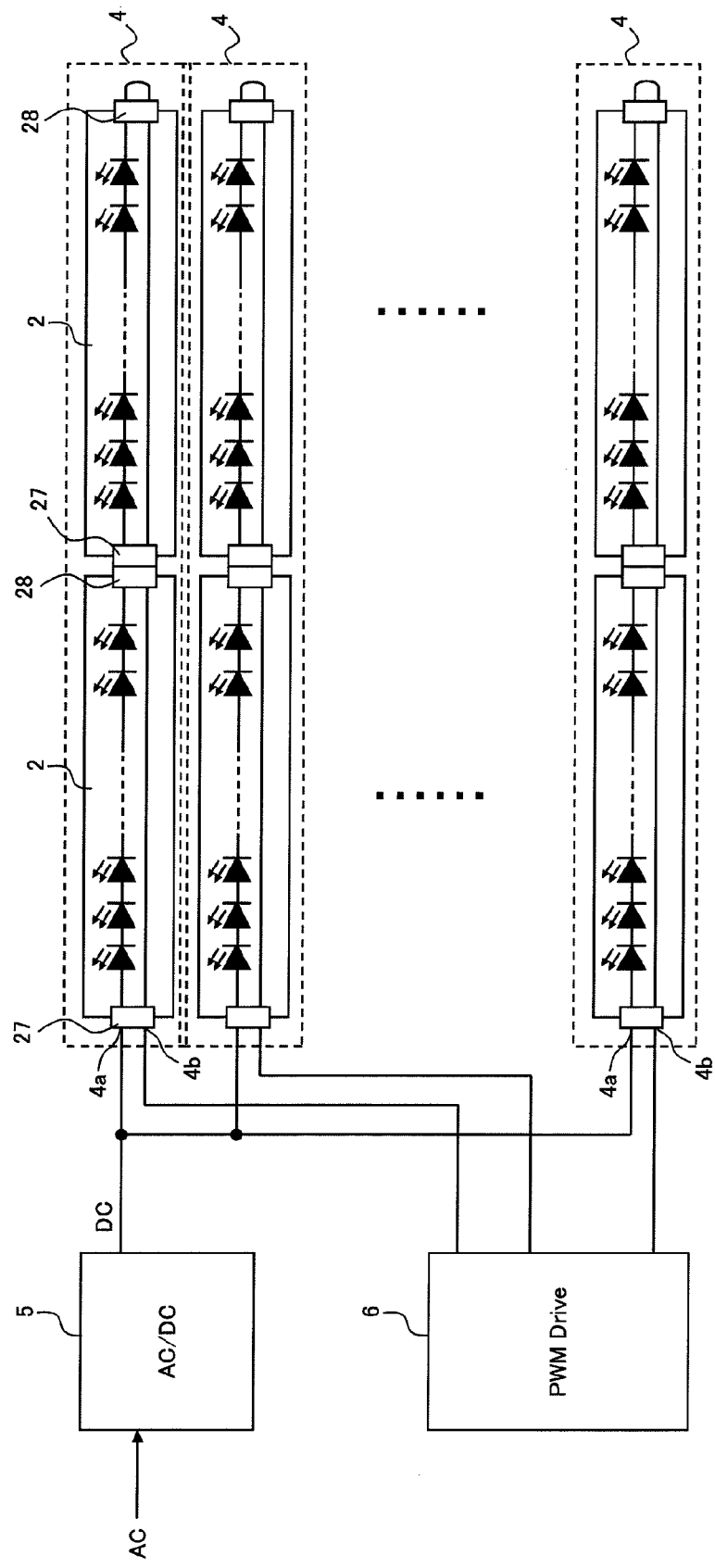
FIG. 6 is a block diagram showing one configuration example of a drive circuit of a series circuit of the LED elements shown in FIG. 4.

The potential of the wiring metal thin film 21 shown in FIGS. 5A and 5B is a potential of one node on the series circuit 4 of the LED elements 1 shown in FIG. 4. FIG. 6 shows one example of a drive circuit of the series circuit 4 of the LED elements 1 shown in FIG. 4. As shown in FIG. 6, the circuit is provided outside the light source device and composed of a AC/DC converter 5 to convert a AC power to a DC power and supply the converted power to each anode terminal 4*a* of the series circuit 4, and a control circuit 6 connected to each cathode terminal 4*b* of the series circuit 4, to control brightness of each LED element by driving a current flowing in each series circuit 4 by PWM (pulse width modulation), and controlling an effective current amount flowing in the LED element 1 of the series circuit 4.

In a case where the LED element 1 is composed of three LED chips connected in series, when a drive current is applied to the series circuit 4 to light up, voltage drop of about 11 V which exceeds forward bias Vf (about 8 V) of the three LED chips is generated in one LED element 1. Therefore, the voltage drop between both ends of the LED element 1 is about 3 V due to intermittent on/off drive by the PWM. When it is assumed that one series circuit 4 is composed of 13 LED elements 1, a potential change for 13 LED elements 1 (about 3 V×13=about 39 V) appears in the wiring metal thin film 21 <7> connected to the cathode terminal 4*b* of the series circuit 4 and the wiring metal thin film 22. Therefore, a potential fluctuation within a range of about 3 V to about 39V appears in the wiring metal thin films 21 on the series circuit 4. In addition, according to this embodiment, a small current (such as 1 mA or less) flows in the series circuit 4 even at the time of off of the on/off drive, and roughly the same voltage as the forward bias Vf is applied to each LED element 1. At the time of on, the larger drive current (such as several 10 mA) than that at the time of off is allowed to flow. Therefore, although a complete off state in which a current does not flow at all is not provided at the time of off of the turn/off drive, in the following description (including the descriptions of FIGS. 8 and 9), the change in conductive state (large or small of the current) by the intermittent drive is distinguished such that the large current state is an on state and the small current state is off state.

As shown in FIG. 5A, when the radiating metal thin film 23 is in the floating state, the potential fluctuation of the wiring metal thin films 21 on the surface side of the LED substrate 2 is coupled to the radiating metal thin film 23 on the back surface side of the LED substrate 2, due to capacitive coupling between the wiring metal thin film 21 and the radiating metal thin film 23, and the potential of the radiating metal thin film 23 also fluctuates in synchronization with the intermittent on/off drive by the PWM. Here, as described above, under the circumstances that the gap between the chassis 3 of the backlight device and the LED substrate 2 is very small, the LED substrate 2 is secured to the chassis 3 with the screw or the rivet, and likely to be bent. Thus, when the potential of the radiating metal thin film 23 opposed in parallel to the back surface plate 3*a* of the chassis 3 largely fluctuates with respect to the ground potential of the chassis 3, in synchronization with the PWM drive as described above, it is thought that coulombic force applied between the back surface plate 3*a* and the radiating metal thin film 23 changes, and a relative distance between the back surface plate 3*a* and the radiating metal thin film 23 fluctuates, so that the thinned LED substrate 2 oscillates and comes into contact with the back surface plate 3*a* repeatedly, and the sound phenomenon is generated. In addition, when the LED substrate 2 oscillates, the above sound phenomenon could be generated due to friction with the other member such as a screw or rivet to support the LED substrate 2 even when it doe not come into contact with the back surface plate 3*a* repeatedly.

Meanwhile, as shown in FIG. 5B, when the potential of the radiating metal thin film 23 is set to the same potential as that of the back surface plate 3*a* of the chassis 3, the potential fluctuation of the wiring metal thin film 21 on the surface side of the LED substrate 2 is prevented from appearing on the radiating metal thin film 23 on the back surface side of the LED substrate 2 due to the capacitive coupling, and the coulombic force itself is prevented from being applied between the back surface plate 3*a* and the radiating metal thin film 23, so that the sound phenomenon caused by the change in coulombic force can be prevented.

Next, a description will be made of a verification experiment of a mechanism of generating the sound phenomenon, and a result of an experiment to confirm a sound suppression effect.

Figure 7A:
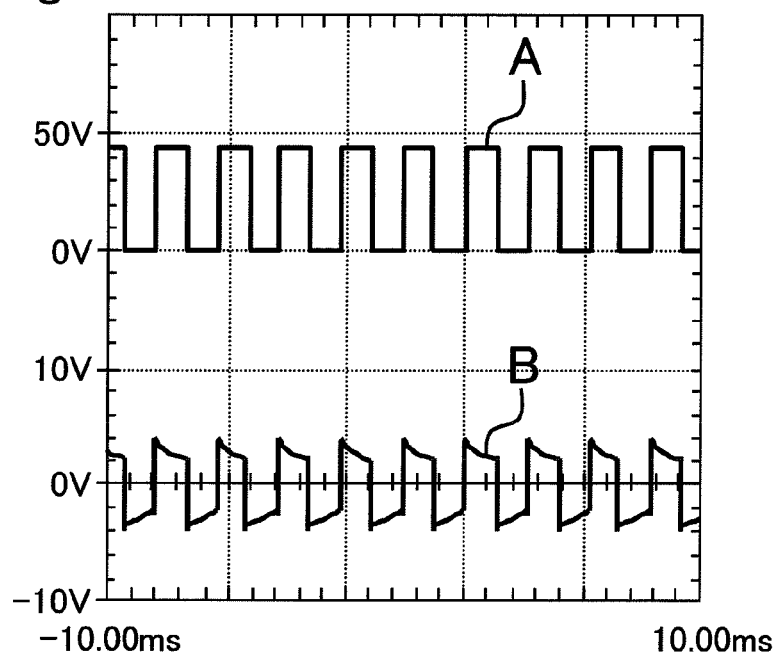
FIGS. 7A and 7B are voltage waveform diagrams showing a verification experiment result of a mechanism of generating a sound phenomenon.
Figure 7B:
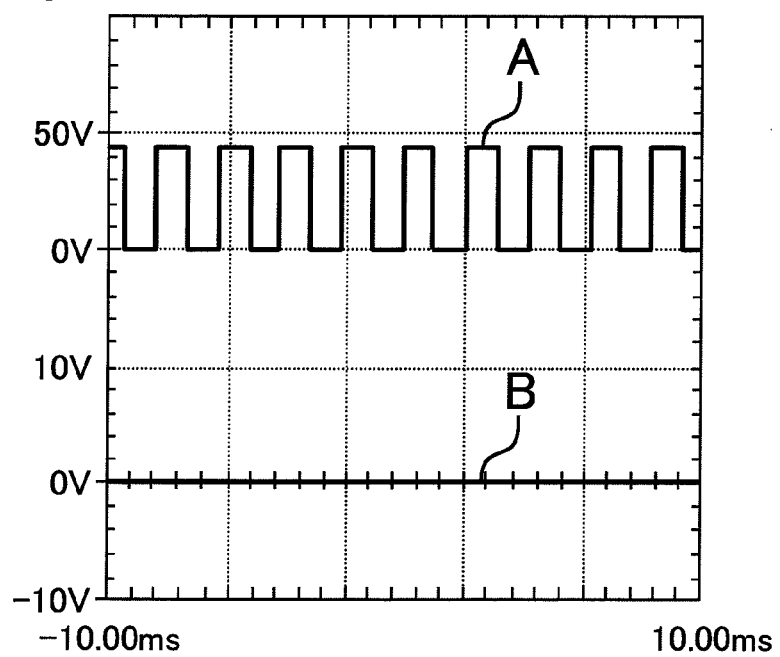

FIGS. 7A and 7B show a voltage waveform provided by observing, with a synchroscope, a voltage change induced in the radiating metal thin film 23 on the back side of the LED substrate 2 provided under the condition that the LED substrate 2 capable of carrying five of the LED elements 1 each composed of the three LED chips connected in series and the LED substrate 2 capable of carrying eight of them are connected in series to prepare test substrates in which a short circuit is caused between the adjacent land parts 21*a* and 21*b* without carrying the LED element 1, and voltage pulses having the same voltage amplitude are commonly applied to the wiring metal thin films 21 and 22 on the surface side of the LED substrate 2, whereby the state in which the LED element 1 is mounted and driven by the PWM is simulated. FIG. 7A shows the case where the radiating metal thin film 23 is in the floating state, and FIG. 7B shows the case where the potential of the radiating metal thin film 23 is the same as that of the back surface plate 3*a*. In either case, an upper part shows a voltage waveform A applied to the wiring metal thin films 21 and 22, and a lower part shows a voltage waveform B induced in the radiating metal thin film 23. As for the voltage pulse applied to the wiring metal thin films 21 and 22, a frequency is 480 Hz, a duty ratio is 50%, and a voltage amplification is 45 V, and the voltage waveform B induced in the radiating metal thin film 23 is a differentiated waveform of the voltage waveform A, and changed within a range of about −4 V to +4 V.

In addition, the voltage waveforms shown in FIG. 7A and 7B are observed under the condition that the LED substrate 2 is supported by the chassis 3, and at the same time, subjective assessment is conducted regarding whether the noise (sound) is generated or not. As a result, when the radiating metal thin film 23 is in the floating state shown in FIG. 7A, the sound is generated, and when the radiating metal thin film 23 has the same potential as that of the back surface plate 3a shown in FIG. 7B, the sound is not generated. According to the above result, it has been confirmed that the voltage change induced in the radiating metal thin film 23 is related to the sound, and the sound can be eliminated by suppressing the voltage change induced in the radiating metal thin film 23.

Figure 9:
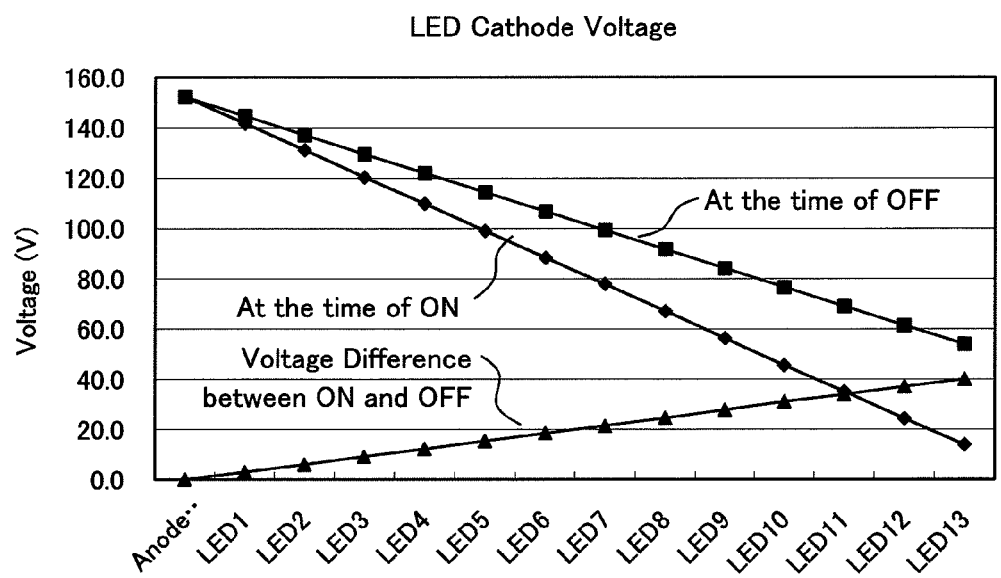
FIG. 9 is a graph of the voltage data shown in FIG. 8.
Figure 10:
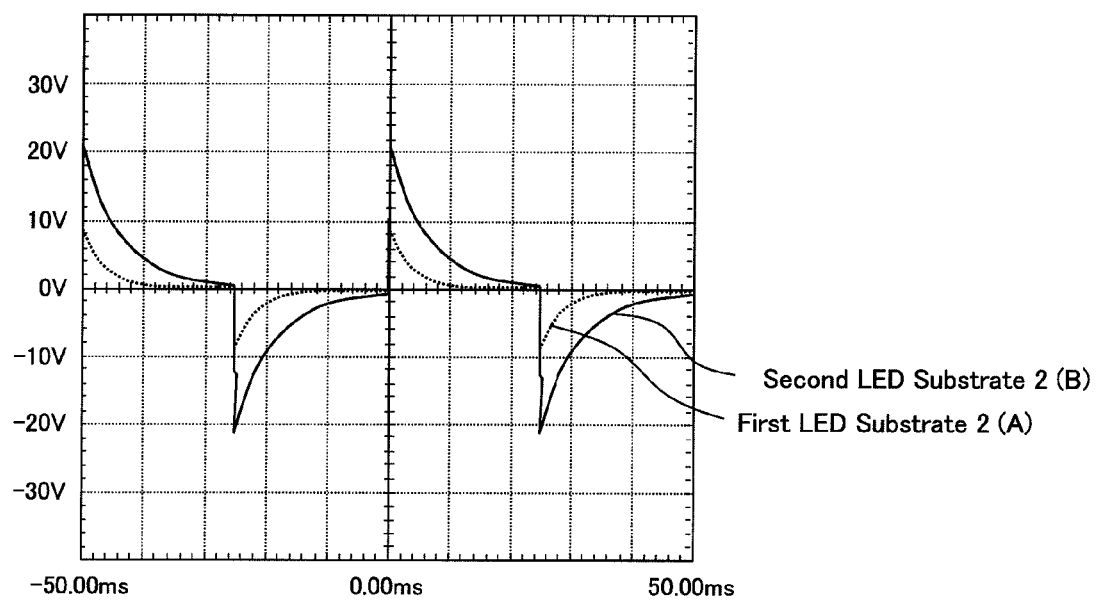
FIG. 10 is a voltage waveform diagram showing a voltage change induced in each radiating metal thin film on the back surface side of the LED substrate due to the voltage change shown in FIGS. 7A and 7B.
Figure 12:
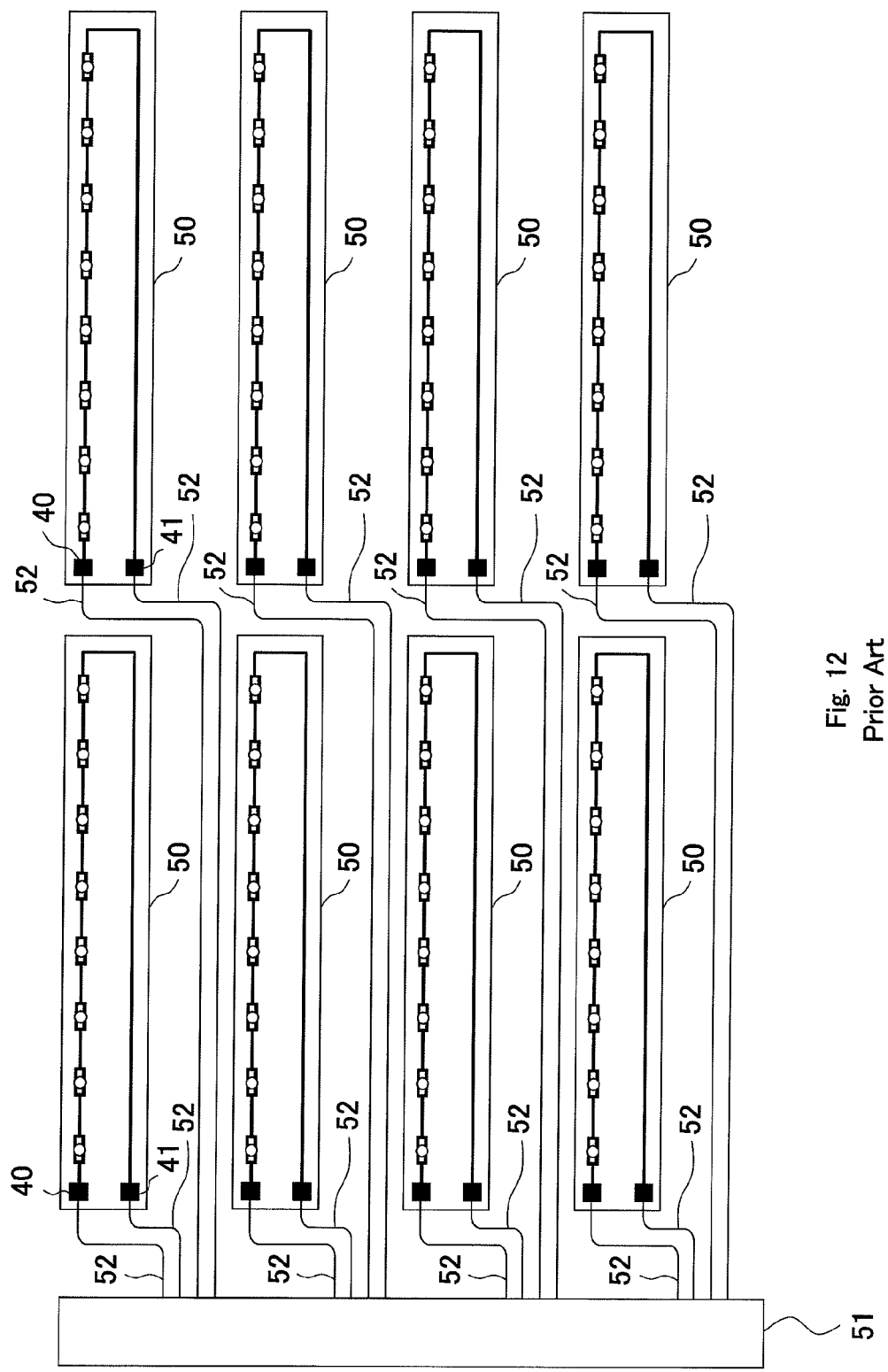
FIG. 12 is a view showing a connection example in which eight LED modules shown in FIGS. 11A and 11B are connected in parallel.
Figure 13:
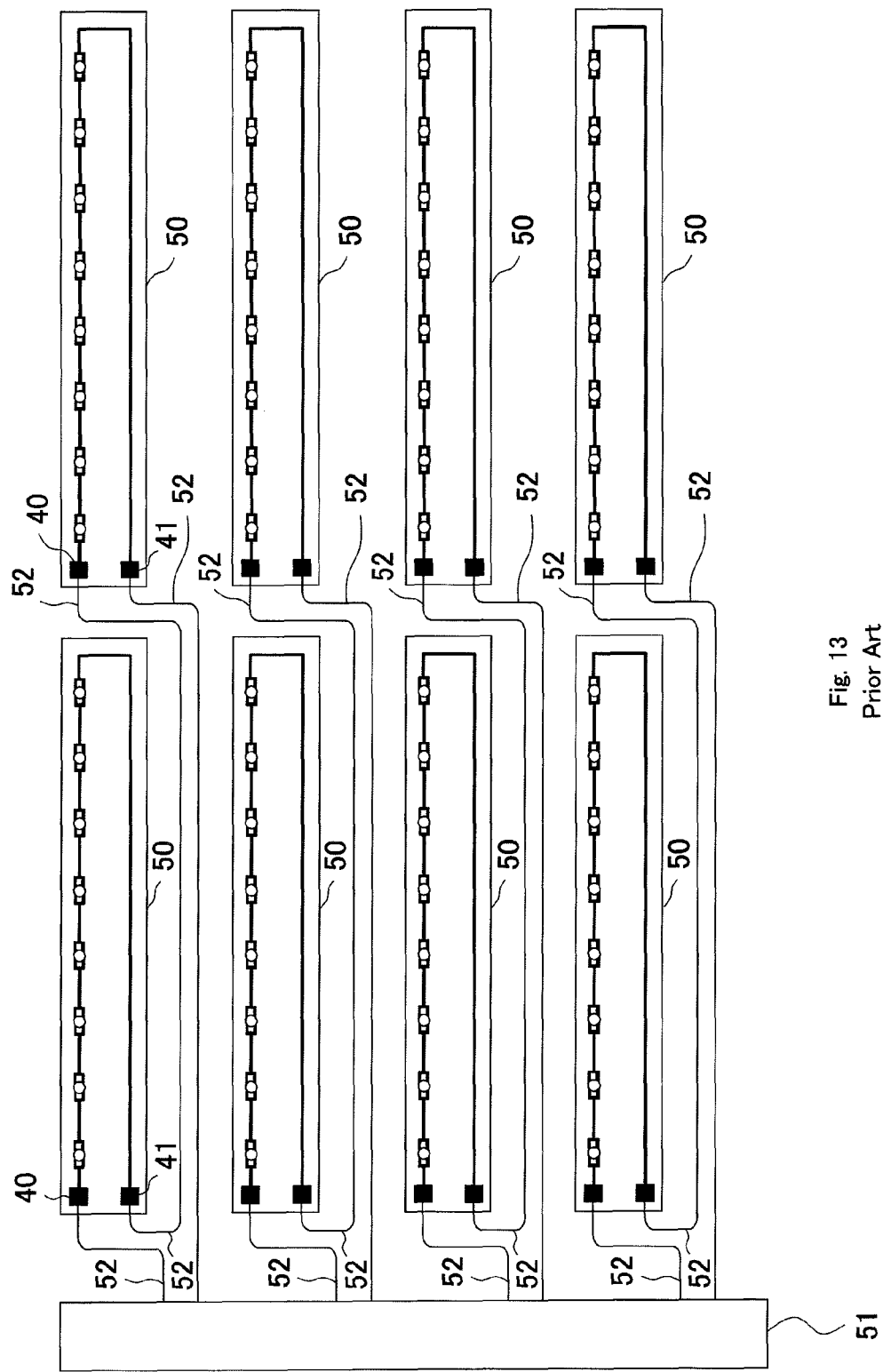
FIG. 13 is a view showing a connection example in which eight LED modules shown in FIGS. 11A and 11B are connected in parallel.

Then, under the condition that the two kinds of LED substrates 2 used in the voltage waveform observation shown in FIGS. 7A and 7B are connected in series, and the LED elements 1 each composed of three LED chips connected in series are mounted, whereby a series circuit is formed of the 13 LED elements 1, potential changes of the wiring metal thin films 21 connected to the cathode terminals of the 13 LED elements 1 are observed at the time of on and off of the LED elements 1 when the series circuit is driven by the PWM. Its result is shown in a table in FIG. 8 and in a graph in FIG. 9, and a voltage change induced in the radiating metal thin film 23 of each of the two kinds of LED substrates 2 is shown in FIG. 10. In this experiment, 152.2 V is applied to the anode terminal of the series circuit of the 13 LED elements 1, and a current of 60 mA is driven by the PWM at a frequency of 20 Hz and at a duty ratio of 50% from the cathode terminal of this series circuit. In FIGS. 8 and 9, the 13 LED elements 1 are distinguished as LED 1 to LED 13 in this order from the side close to the anode terminal of the series circuit. In addition, the five LED elements 1 on the side close to the anode terminal are mounted on a first LED substrate 2A, and the eight LED elements 1 apart from the anode terminal are mounted on a second LED substrate 2B, and FIG. 10 shows the voltage changes induced in the radiating metal thin films 23 on the back surface sides of the first and second LED substrates 2A and 2B.

As shown in FIGS. 8 and 9, since a constant voltage is applied to the anode terminal of the series circuit of the 13 LED elements 1, and the current is driven from the side of the cathode terminal of the series circuit, the voltage changes of the LED elements 1 at the time of on and off increase with the increasing distance from the anode terminal. As a result, as shown in FIG. 10, of the two kinds of LED substrates 2, the voltage change induced in the radiating metal thin film 23 of the second LED substrate 2B on the side distant from the anode terminal of the series circuit is larger than the voltage change induced in the radiating metal thin film 23 of the first LED substrate 2A on the side close to the anode terminal of the series circuit. This result coincides with the result of the subjective evaluation revealing that the sound generated due to the oscillations of the second LED substrate 2B is louder than that of the first LED substrate 2A.

Therefore, in the case where the plurality of LED substrates 2 are connected in series, and the series circuit of the LED elements 1 is formed, and the potential of the radiating metal thin film 23 of any one of the LED substrate 2 among the plurality of LED substrates 2 is made to conform to that of the back surface plate 3a of the chassis 3, the sound phenomenon can be most effectively suppressed when the radiating metal thin film 23 of the LED substrate 2 whose voltage change induced in the radiating metal thin film 23 is largest is set to the same potential as that of the back surface plate 3a of the chassis 3.

Hereinafter, a description will be made of another embodiment of the device of the present invention.

(1) According to the above embodiment, as one example of the drive circuit of the series circuit 4 of the LED elements 1, as shown in FIG. 6, the circuit is configured such that the predetermined DC voltage is supplied from the power supply (AC/DC converter 5) to each anode terminal 4a of the series circuit 4, and the control circuit 6 is connected to each cathode terminal 4b of the series circuit 4, and the current flowing in each series circuit 4 is driven by the PWM. Here, instead of the above, a circuit may be configured such that a predetermined DC voltage (such as the ground voltage) is supplied to each cathode terminal 4b of the series circuit 4, and the control circuit 6 to which a voltage is supplied from the power supply (AC/DC converter 5) is connected to each anode terminal 4a of the series circuit 4, and the current flowing in each series circuit 4 is driven by the PWM.

Furthermore, the drive of the series circuit 4 of the LED elements 1 is not necessarily limited to the PWM drive. In the case of pulse drive, since the driven current is turned on and off intermittently, the potential largely changes in each part of the wiring metal thin films 21 and 22 on the surface side of the LED substrate 2, so that the sound phenomenon becomes noticeable. Thus, in another drive method also, when the similar sound phenomenon is generated, like the above embodiment, the potential of the radiating metal thin film 23 on the back surface side of the LED substrate 2 is to be made to conform to that of the back surface plate 3a of the chassis 3 (or have a predetermined potential difference as will be described below). In addition, in a case where pulse density modulation (PDM) is used as the same pulse drive, while the sound phenomenon similar to the PWM drive is prominently generated, the sound phenomenon can be effectively prevented by the present invention.

(2) While the potential of the radiating metal thin film 23 on the back surface side of the LED substrate 2 is set to the same as that of the back surface plate 3a of the chassis 3 in the above embodiment in order to suppress the noise (sound) of the light source device, the above sound can be also suppressed when the potential of the radiating metal thin film 23 is constant and a potential difference from the potential of the back surface plate 3a of the chassis 3 is constant, similar to the case where the potential of the radiating metal thin film 23 is made to conform to that of the back surface plate 3a, because coulombic force applied between the radiating metal thin film 23 and the back surface plate 3a does not change in response to the on/off of the current to drive the LED element 1.

This fact means that it is only necessary to provide a wiring metal thin film instead of the radiating metal thin film 23 or in addition to it, on the back surface side of the LED substrate 2 and use a drive method to keep constant the potential supplied to the wiring metal thin film. For example, the wiring metal thin film 22 on the surface side of the LED substrate 2 is provided on the back surface side, and the wiring metal thin film 22 is connected to the anode terminal 4a of the series circuit 4 of the LED elements 1, and the anode terminal and the cathode terminal of the LED element 1 connected to the wiring metal thin film 21 on the surface side are reversed, whereby a constant potential is supplied to the wiring metal thin film 22 on the back surface side. Alternatively, as shown in the another embodiment (1), the circuit may be configured such that each anode terminal 4a of the series circuit 4 is connected to the control circuit 6 and the current flowing in each series circuit 4 is driven by the PWM, and the wiring metal thin film 22 on the back surface side is connected to the cathode terminal 4b of the series circuit 4, whereby a constant potential is supplied to the wiring metal thin film 22 on the back surface side.

(3) The material and shape of each part shown in the above embodiments are one example and the present invention is not limited to the above. In addition, while the connectors 27 and 28 are provided at longitudinal both ends in the LED substrate 2, an electrode (land) to solder an external wire (lead or the like) may be provided on the insulation substrate 20 instead of the connectors 27 and 28.

(4) While the LED element is provided as the light emitting element in the above embodiments, the present invention is not limited to the LED element and any element may be used as long as it can emit light by a current.

Although the present invention has been described in terms of a preferred embodiment, it will be appreciated that various modifications and alterations might be made by those skilled in the art without departing from the invention. The invention should therefore be measured in terms of the claims which follow.

What is claimed is:

1. A light source device comprising:
one or more flat substrates each having a light emitting element on its surface side, the substrates being supported by a chassis having a conductive flat plate surface so that back surfaces of the substrates are opposed to the flat plate surface of the chassis, the light emitting element driven by pulse current, wherein
each of the substrates is provided with a plurality of first conductive thin films for wiring formed on a surface side of an insulation substrate, and one or more second conductive thin films for radiating or wiring formed on a back surface side of the insulation substrate,
two terminals of the light emitting element are connected to the two adjacent first conductive thin films, respectively, and
a potential of at least one of the second conductive thin films is fixed to have a constant potential difference with respect to a potential of the flat plate surface of the chassis;
the light source device further comprising:
a connection terminal at an end side of each of the substrates or in a vicinity of the end side, electrically connected to the first conductive thin film formed in the vicinity of the end side, and used to electrically connect to an external circuit or the other substrate, wherein
a series circuit is formed of the light emitting elements mounted on the plurality of substrates by connecting the connection terminal of the one substrate to the connection terminal of the other substrate to connect the plurality of substrates, and
brightness of the plurality of light emitting elements of the series circuit is controlled by supplying a fixed potential from one side end of the series circuit and driving a current flowing in the series circuit from the other side end of the series circuit,
wherein a potential of the second conductive thin films is fixed to have a predetermined potential difference with respect to the potential of the flat plate surface of the chassis in at least one of the plurality of substrates, provided with the light emitting element having a maximum potential fluctuation at a terminal of the light emitting element due to drive of the current flowing in the series circuit.

2. A light source device comprising:
one or more flat substrates each having a light emitting element on its surface side, the substrates being supported by a chassis having a conductive flat plate surface so that back surfaces of the substrates are opposed to the flat plate surface of the chassis, the light emitting element driven by pulse current, wherein
each of the substrates is provided with a plurality of first conductive thin films for wiring formed on a surface side of an insulation substrate, and one or more second conductive thin films for radiating or wiring formed on a back surface side of the insulation substrate,
two terminals of the light emitting element are connected to the two adjacent first conductive thin films, respectively, and
a potential of at least one of the second conductive thin films is fixed to have a constant potential difference with respect to a potential of the flat plate surface of the chassis,
wherein the potential of at least one of the second conductive thin films is fixed to the same potential as the potential of the flat plate surface of the chassis by opening a part of an insulation film covering the second conductive thin films provided on the back surface side of the substrates, and bringing the second conductive thin film exposed from the opening part of the insulation film into contact with the flat plate surface of the chassis directly or through a conductive connection member.

3. A light source device comprising:
one or more flat substrates each having a light emitting element on its surface side, the substrates being supported by a chassis having a conductive flat plate surface so that back surfaces of the substrates are opposed to the flat plate surface of the chassis, the light emitting element driven by pulse current, wherein
each of the substrates is provided with a plurality of first conductive thin films for wiring formed on a surface side of an insulation substrate, and one or more second conductive thin films for radiating or wiring formed on a back surface side of the insulation substrate,
two terminals of the light emitting element are connected to the two adjacent first conductive thin films, respectively, and
a potential of at least one of the second conductive thin films is fixed to have a constant potential difference with respect to a potential of the flat plate surface of the chassis;
the light source device further comprising:
a second connection terminal provided at an end side of each of the substrates or in a vicinity of the end side, electrically connected to the second conductive thin films formed in the vicinity of the end side, and used to electrically connect to an external circuit or the other substrate, wherein
the potential of at least one of the second conductive thin films is fixed to the same potential as the potential of the flat plate surface of the chassis by electrically connecting the second connection terminal to the flat plate surface of the chassis.

4. A light source device comprising:
one or more flat substrates each having a light emitting element on its surface side, the substrates being supported by a chassis having a conductive flat plate surface so that back surfaces of the substrates are opposed to the flat plate surface of the chassis, wherein each of the substrates is provided with a plurality of first conductive thin films for wiring formed on a surface side of an insulation substrate, and one or more second conductive thin films for radiating or wiring formed on a back surface side of the insulation substrate, two terminals of the light emitting element are connected to the two adjacent first conductive thin films, respectively, a potential of at least one of the second conductive thin films is fixed to have a constant potential difference with respect to a potential of the flat plate surface of the chassis, the plurality of light emitting elements are mounted on the one or more substrates, and at least two of the plurality of light emitting elements are connected in series to form a series circuit, and brightness of the plurality of light emitting elements of the series circuit is controlled by supplying a fixed potential from one side end of the series circuit and driving a current flowing in the series circuit from the other side end of the series circuit.

5. The light source device according to claim 4, wherein the potential of at least one of the second conductive thin films is fixed to the same potential as the potential of the flat plate surface of the chassis.

6. The light source device according to claim 4, wherein at last one of the second conductive thin films is a radiating conductive thin film, and not electrically connected to the terminals of the light emitting element.

7. The light source device according to claim 4, wherein the current flowing in the series circuit is driven by pulse width modulation.

8. A light source device comprising:

one or more flat substrates each having a light emitting element on its surface side, the substrates being supported by a chassis having a conductive flat plate surface so that back surfaces of the substrates are opposed to the flat plate surface of the chassis, wherein each of the substrates is provided with a plurality of first conductive thin films for wiring formed on a surface side of an insulation substrate, and one or more second conductive thin films for radiating or wiring formed on a back surface side of the insulation substrate, two terminals of the light emitting element are connected to the two adjacent first conductive thin films, respectively, a potential of at least one of the second conductive thin films is fixed to have a constant potential difference with respect to a potential of the flat plate surface of the chassis, a connection terminal at an end side of each of the substrates or in a vicinity of the end side, electrically connected to the first conductive thin film formed in the vicinity of the end side, and used to electrically connect to an external circuit or the other substrate, a series circuit is formed of the light emitting elements mounted on the plurality of substrates by connecting the connection terminal of the one substrate to the connection terminal of the other substrate to connect the plurality of substrates, and brightness of the plurality of light emitting elements of the series circuit is controlled by supplying a fixed potential from one side end of the series circuit and driving a current flowing in the series circuit from the other side end of the series circuit.

9. The light source device according to claim 8, wherein the potential of at least one of the second conductive thin films is fixed to the same potential as the potential of the flat plate surface of the chassis.

10. The light source device according to claim 8, wherein at last one of the second conductive thin films is a radiating conductive thin film, and not electrically connected to the terminals of the light emitting element.

11. The light source device according to claim 8, wherein the current flowing in the series circuit is driven by pulse width modulation.

* * * * *